UNITED STATES PATENT OFFICE.

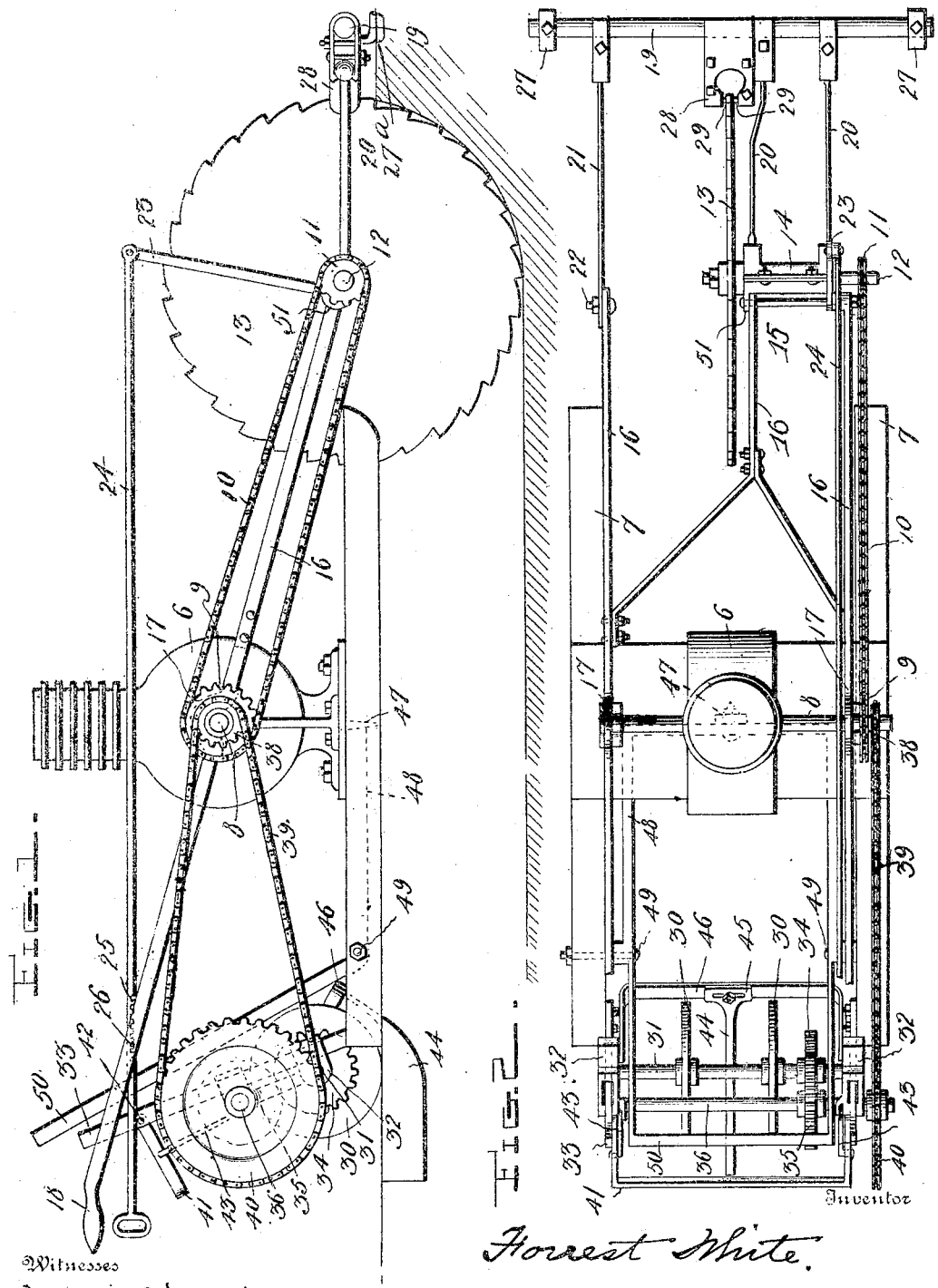

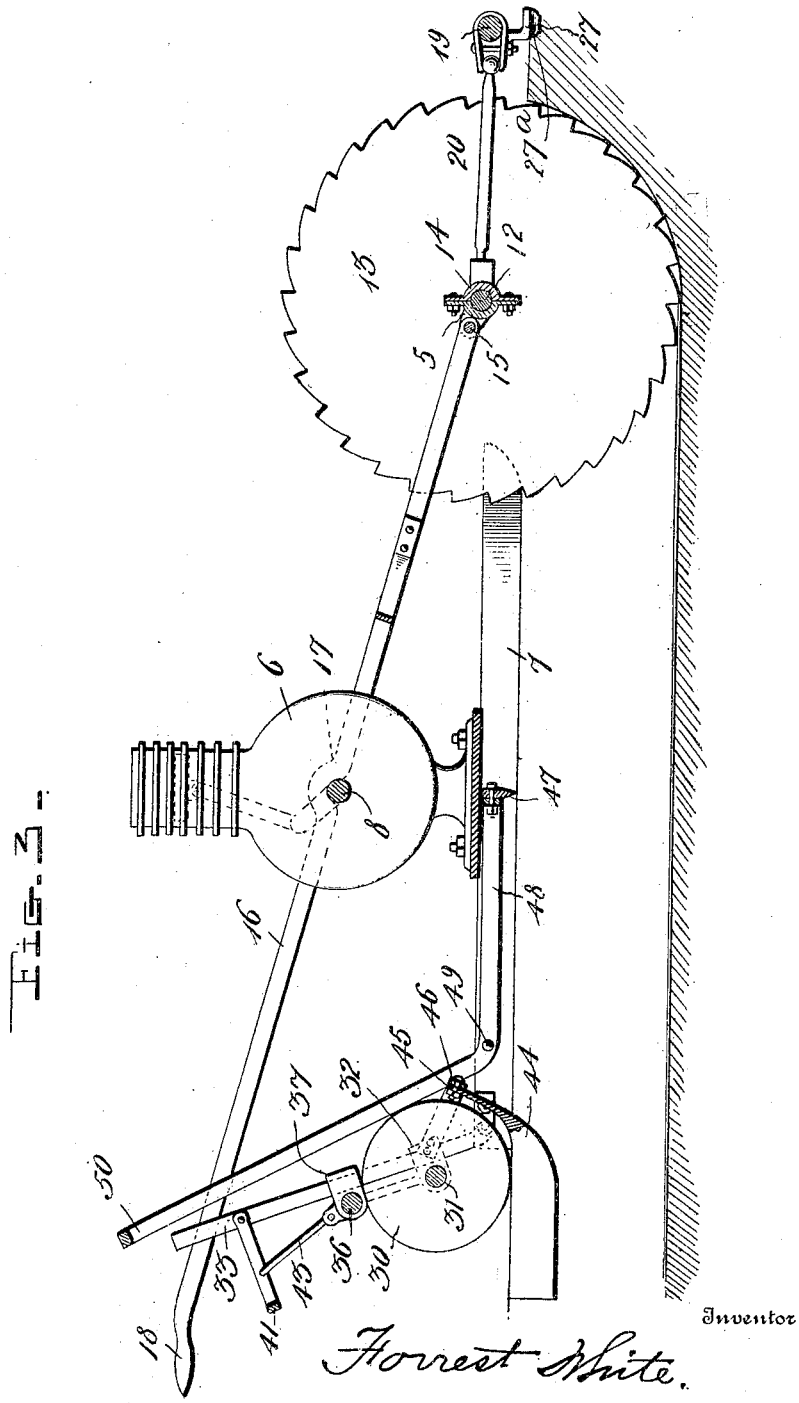

FORREST WHITE, OF EUCLID, OHIO.

ICE-CUTTING MACHINE.

No. 879,933.  Specification of Letters Patent.  Patented Feb. 25, 1908.

Application filed November 21, 1906. Serial No. 344,459.

*To all whom it may concern:*

Be it known that I, FORREST WHITE, a citizen of the United States, residing at Euclid, in the county of Cuyahoga and State of Ohio, have invented new and useful Improvements in Ice-Cutting Machines, of which the following is a specification.

The invention relates to machines for cutting ice in the field.

It has for its object to provide an adjustable saw guide making it possible to control the saw so that it will saw straight.

A further object is to provide means for raising and lowering the saw, and also improved traction means for driving the machine over the ice and for steering the same, the latter being assured by an improved rudder.

Various other objects and advantages will appear from the following description and the accompanying drawings.

In the drawings, Figure 1 is a side elevation of the machine. Fig. 2 is a plan view thereof. Fig. 3 is a longitudinal vertical section.

The machine is motor driven, the engine or motor being indicated at 6, mounted upon a pair of runners 7, which runners form substantially the sole supporting means for the apparatus. The main driving shaft, driven by the motor, is indicated at 8. This is mounted in suitable supports on the frame of the motor or engine, and is geared by means of a sprocket 9, chain belt 10, and sprocket 11, to the shaft 12 of the saw 13 which is located at about the middle line of the machine in front of the runners and the motor.

The saw arbor or shaft 12 is carried in a boxing 14 which is hinged by a bolt 15 and ears 51 to the front end of a swinging frame 16 the side bars of which are bowed over and pivoted upon the boxes of the main shaft 8, as indicated at 17, and at the right side said frame is continued to the rear to connection with a handle 18, so that the saw may be raised from or lowered to the ice by swinging the frame on the main shaft as a pivot. By this means, too, the saw arbor is at all times the same distance from the shaft, so that the gearing is not interfered with. The skeleton frame is an advantage because it avoids the lodgment of snow and ice thereon.

In advance of the saw, a gage bar and support 19 is provided. This is connected to the boxing 14 of the saw arbor by means of spring bars 20 which are flattened vertically so that they will allow a certain amount of lateral spring. The gage bar is also supported by a similar bar 21, at the opposite side of the machine, and this bar is hinged at its rear end, as at 22, to the corresponding side bar of the frame 16, the hinge 22 being in line with the hinge bolt 15, so that the whole supporting frame of the saw may be flexed on said hinges as a pivot. This makes it possible to readily adjust the depth of cut by raising or lowering the gage bar 19, this action being effected by means of an upright arm 23, bolted to the boxing 14 and connected to a rod 24 which extends back to the rear of the machine where it is provided with a handle and with a rack 25 engageable with a catch 26 on the lever 16, to hold the parts at adjustment. It is obvious that by pulling on the rod 24 the gage bar 19 will be raised, thus lowering the axis of the saw, and vice versa. The gage bar 19 is clamped to and rests upon shoes 27 which slide on the surface of the ice and which support said gage bar slightly above the ice. The shoes have kerf plates 27$^a$, one of which slides in the preceding kerf and the other of which travels on the ice.

A saw guide is supported upon the gage bar 19 for the purpose of guiding and steadying the saw; said guide is indicated at 28 and has fingers 29 which press against the opposite sides of the edge of the saw and which when the guide bar is sprung one way or the other will spring the cutting edge of the saw so that it will cut in any course, without binding. The arms 20 and 21 are made of spring metal so that they will spring sidewise and allow the saw guide on the saw to bend the cutting edge of the saw so that it will saw its way through, without binding. The shoes 27 may be adjusted lengthwise on the bar 19, according to the width of the strip to be cut, acting as leaders by being placed at equal distances on opposite sides of the saw, such distance being equal to the width of the strip to be cut.

The driving means consist of a pair of spud traction wheels 30 which are carried on a shaft 31 mounted in bearing boxes 32 which are slidable up and down on inclined supports 33 at the rear end of the runners 7. The traction wheel shaft has a gear 34 meshing with a pinion 35 on a cross shaft 36 which is also carried in sliding boxes 37 on the supports 33, and said shaft 36 is driven from the main shaft 8 by means of a sprocket 38, chain belt 39 and sprocket 40 on the end of the shaft 36, the latter wheel being preferably large to form a fly-wheel. The traction wheels may be raised and lowered from or to the ice by means of a lever 41 at the rear, pivoted at 42 to the supports 33 and connected by rods 43 to the boxes 37 and 32. By means of this lever the boxes may be slid up and down on the supports and the traction wheels are thereby engaged with or disengaged from the ice. To guide the machine, and prevent lateral slide or movement thereof, a rudder is provided consisting of a plate 44 which stands edgewise between the traction wheels 30 and under the shaft thereof, being carried by a bracket 45 secured to a spring cross bar 46 which is fastened at its ends to the boxes 32. The spring cross bar allows the rudder to spring up and run along the top of the ice when the apparatus is passing over uncut ice, but when the saw is cutting, the rudder plate, which is located in line with the saw, enters the kerf and so follows the saw directly and prevents side pressure on the saw and also prevents the machine from sliding sidewise should one traction wheel drive stronger than the other, or for other reason. Also, when the boxes 32 are lifted the traction wheels are lifted, as heretofore described, and also the rudder, disengaging the latter from the kerf.

For the purpose of facilitating the turn of the machine at the end of a strip, there is provided a sharpened pivot pin 47 which is carried at the middle of the machine by an angular cross bar 48 pivoted at 49 to the runners, between the same, and provided at one side with an upwardly-extending lever 50, whereby the pivot pin may be raised or lowered. When turning the machine, the traction wheels and rudder and also the frame containing saw and gage bar are raised free from the ice, so that the machine is carried by the runners 7. The machine is then moved sidewise a distance equal to the width of the next strip to be cut, and the pin is then pushed down into the ice to form a pivot for the machine, which can then be swung around a half turn. The pivot pin is then raised and the traction wheels and rudder and the frame containing saw and gage bar are lowered for the next cut.

I claim:

1. In an ice cutting machine, in combination, runners, a vertically-swinging frame supported thereon and extending forwardly in front of the runners, a boxing hinged to the front end of said frame, a saw having its arbor journaled in the boxing, an operating lever connected to the boxing to raise or lower the saw, and means to drive the saw.

2. In an ice cutting machine, in combination, runners, a vertically-swinging frame supported thereon and extending forwardly therefrom, a boxing hinged to the front end of said frame, a saw having its arbor journaled in the boxing, a gage bar connected to the frame and extending across in front of the saw and having shoes which rest on the ice, means to drive the saw, and means to turn the boxing on its hinge to raise and lower the saw.

3. In an ice cutting machine, in combination, runners, a vertically-swinging frame pivotally mounted thereon, a bar connected to the front end of the frame and having shoes which slide on the ice, a hinge joint in the frame between its pivot and the said bar, a saw supported on said frame, at about the hinge joint, so that it is raised or lowered by flexing said joint, means to drive said saw, and means to adjustably flex said joint.

4. In an ice cutting machine, in combination, runners, a saw, means carried on the runners to support and drive the saw, a gage bar having shoes, extending across in advance of the saw, and a saw guide mounted upon the gage bar.

5. In an ice cutting machine, in combination, runners, a saw, means carried on the runners to support and drive the saw, a gage bar having shoes, extending across in advance of the saw, and a saw guide mounted upon the gage bar, and having fingers which engage the edge of the saw on opposite sides thereof.

6. In an ice cutting machine, in combination, runners, a saw frame thereon, a saw carried at the front end of the frame, a gage bar extending across in front of the saw, laterally-flexible rods connecting the bar and the frame, and a saw guide carried by the bar.

In testimony whereof I have signed my name to this specification in the presence of two subscribing witnesses.

FORREST WHITE.

Witnesses:
 JOHN A. BOMMHARDT,
 SHIRLEY J. BOMMHARDT.